United States Patent
Jerbi et al.

(10) Patent No.: US 8,549,110 B2
(45) Date of Patent: Oct. 1, 2013

(54) METHOD FOR TRANSMITTING DATA

(75) Inventors: Belhassen Jerbi, Kirchheim (DE); Josef Laumen, Hildesheim (DE); Andreas Schmidt, Braunschweig (DE); Markus Trauberg, Velchede (DE); Sabine Van Niekerk, Salzgitter (DE)

(73) Assignee: Cinterion Wireless Modules GmbH, Munich (DE)

(*) Notice: Subject to any disclaimer, the term of this patent is extended or adjusted under 35 U.S.C. 154(b) by 1048 days.

(21) Appl. No.: 10/482,444

(22) PCT Filed: Jun. 24, 2002

(86) PCT No.: PCT/EP02/06973
§ 371 (c)(1),
(2), (4) Date: Jul. 27, 2004

(87) PCT Pub. No.: WO03/001769
PCT Pub. Date: Jan. 3, 2003

(65) Prior Publication Data
US 2004/0260791 A1 Dec. 23, 2004

(30) Foreign Application Priority Data
Jun. 25, 2001 (DE) .................... 101 30 537
Oct. 19, 2001 (DE) .................... 101 51 743

(51) Int. Cl.
*G06F 15/16* (2006.01)
(52) U.S. Cl.
USPC ........... 709/219; 455/457; 455/410; 455/419; 455/404.1; 709/220; 709/223; 709/224
(58) Field of Classification Search
USPC ........... 709/203, 226, 225, 227, 229, 213, 709/219, 224, 239; 370/439, 469, 338; 455/1, 455/10, 105, 566.1
See application file for complete search history.

(56) References Cited

U.S. PATENT DOCUMENTS 5,404,505 A * 4/1995 Levinson ................ 348/E7.069
5,844,894 A * 12/1998 Dent ............................ 370/330

(Continued)

FOREIGN PATENT DOCUMENTS

DE 197 42 681 4/1999
EP 1 120 945 8/2001

(Continued)

OTHER PUBLICATIONS http://studenting-steen.se/IPv6/MIX/ggsn.intro.en.pdf "Introduction to the GGSN Node"—Inspira, Sep. 2000.*

*Primary Examiner* — Krista Zele
*Assistant Examiner* — Randy Scott
(74) *Attorney, Agent, or Firm* — Baker Botts L.L.P.

(57) ABSTRACT

Disclosed is a method for transmitting data between a subscriber terminal (MT) and at least one service providing component (MMS-Server 1, MMS-Server 2, MMS-Server 3) associated with a service provider, which are connected to each other by a network (UTRAN, SGSN, GGSN). According to said method, when a communication link is set up between the subscriber terminal and the service providing component, access information for the at least one service providing component is requested by a storage means associated with the subscriber terminal. By providing exclusively specific access information for specific service providing components on said storage means associated with a subscriber or a subscriber device, such as a SIM card or a USIM application on a UICC card, the network operator can prevent a subscriber from using other service providing components of other specific service providers different from those prescribed thereto when a specific data service is requested.

24 Claims, 5 Drawing Sheets

(56) References Cited

U.S. PATENT DOCUMENTS

| | | | |
|---|---|---|---|
| 5,958,006 A * | 9/1999 | Eggleston et al. | 709/219 |
| 5,974,036 A * | 10/1999 | Acharya et al. | 370/331 |
| 6,028,838 A * | 2/2000 | Yamamura et al. | 370/229 |
| 6,304,969 B1 * | 10/2001 | Wasserman et al. | 713/172 |
| 6,336,187 B1 * | 1/2002 | Kern et al. | 713/161 |
| 6,356,541 B1 * | 3/2002 | Muller et al. | 370/338 |
| 6,438,588 B1 * | 8/2002 | Crandall | 709/217 |
| 6,442,588 B1 * | 8/2002 | Clark et al. | 709/203 |
| 6,741,843 B1 * | 5/2004 | Kalliokulju et al. | 455/226.1 |
| 7,266,371 B1 * | 9/2007 | Amin et al. | 455/419 |
| 7,353,211 B2 * | 4/2008 | Hans et al. | 705/67 |
| 7,401,146 B1 * | 7/2008 | Menditto et al. | 709/227 |
| 2001/0029583 A1 * | 10/2001 | Palatov et al. | 713/193 |
| 2002/0029343 A1 * | 3/2002 | Kurita | 713/185 |
| 2002/0078185 A1 * | 6/2002 | Swerup et al. | 709/220 |
| 2002/0080819 A1 * | 6/2002 | Tsao | 370/469 |
| 2002/0116384 A1 * | 8/2002 | Laurila et al. | 707/10 |
| 2002/0188815 A1 * | 12/2002 | Wang et al. | 711/162 |
| 2002/0199094 A1 * | 12/2002 | Strand et al. | 713/150 |
| 2003/0065805 A1 * | 4/2003 | Barnes, Jr. | 709/231 |

FOREIGN PATENT DOCUMENTS

| | | |
|---|---|---|
| EP | 1120945 A1 * | 8/2001 |
| WO | WO 98/57474 | 12/1998 |
| WO | WO 9857474 A1 * | 12/1998 |
| WO | WO 00/41486 | 7/2000 |

* cited by examiner

— Signal Interface
— Signal and Data Transmission Interface

— Signal Interface
— Signal and Data Transmission Interface

METHOD FOR TRANSMITTING DATA

BACKGROUND

The present invention relates to a method for transmitting data between a subscriber terminal and at least one service providing component associated with a service provider via a network and relates in particular to a method with which a communication link can be set up between the subscriber terminal and a specific service providing component, for which access information is requested by a storage means associated with the subscriber terminal when the link is set up.

In mobile telephone technology it is intended to develop new possibilities for providing and transmitting data using future services, such as the Multimedia Messaging Service (MMS) for example. MMS content comprises one or a plurality of elements, such as text, voice, images or video information, etc. A service provider for one of these future services, such as the MMS service, will in many cases be the same as the network operator of the mobile telephone network, whereby it is also possible that in other cases there will be contracts between the network operator and third party service providers. As the air interface managed by the network operator represents a bottleneck to the mobile stations or the mobile telephone devices of the mobile telephone customers, the network operator can request a charge from the service providers. It must therefore be ensured that the mobile telephone customers of a network operator can only utilize a specific service, such as the MMS service or an IMS (Instant Messaging Service or Immediate Messaging Service) service from a quite specific service provider. If this cannot be guaranteed, mobile telephone customers could change to other service providers, offering the required service subject to more favorable conditions, without having to change the network operator in the process.

SUMMARY

Under the embodiments discussed below, the exemplary configuration and methods make it possible to prevent a mobile telephone customer, associated with a specific network operator, to select any service provider they may wish for a specific service.

A method for transmitting data between a subscriber terminal and at least one service providing component of a service provider, which are connected to each other via a network, hereby comprises the following stages. First access information for the at least one service providing component is stored on a storage means (such as a SIM card or a UICC with USIM module) associated with a subscriber. Such storage can for example be initiated or even carried out by the network operator, whereby access authorization or an access authorization code for the network can also be provided on the storage means. After selecting a service providing component, the service of which is to be requested, a communication link is set up from the subscriber terminal (only) to that/those service providing component(s), for which access information is stored on the storage means, while the stored access information is being requested. Selection of a service providing component can comprise selection from a predefined list (for example predefined by the subscriber terminal) of access information stored on the storage means or the inputting of any service providing component via a user interface or a keyboard, whereby it is verified before or while a communication link is being set up by comparison with the access information stored on the storage means, whether the selected or input service providing component is permitted.

According to an advantageous embodiment the network comprises a packet-switched network that operates in particular according to the GPRS (General Packet Radio Service) or the UMTS (Universal Mobile Telecommunications Service) standard and the data is transmitted accordingly in packet-switched form.

According to an advantageous embodiment such a packet-switched network for implementing a packet-switched service essentially comprises two types of interconnected network nodes, specifically at least one serving GPRS support node (SGSN) and at least one gateway GPRS support node (GGSN), which are components of what is known as the core network.

According to a further advantageous embodiment the at least one service providing component is a component or a server of an external PDN (Packet Data Network), which is connected to the above-mentioned (packet-switched) network.

According to a further advantageous embodiment the access information comprises what is known as an end-user address, which contains the access address of the at least one service providing component. The access address here can be an IP (Internet Protocol) address. It is particularly advantageous if the access information is structured so that a specific selection of access addresses for a service providing component of one or a plurality of specific service providers is associated with a specific service such as the MMS service or the IMS service.

With the method described above therefore a specific service provider for a specific service or for a specific application can be permanently pre-allocated to a mobile telephone customer or subscriber, by storing the access information (preferably the IP address of the service providing component of the corresponding service provider) in the storage means associated with the mobile telephone customer or said customer's terminal. It should be noted that the service providing component can comprise a computer arrangement or a server of the corresponding service provider.

The storage means is advantageously an intelligent memory card, such as a SIM (Subscriber Identity Module) card or a UICC (Universal Integrated Circuit Card) with a USIM (UMTS Subscriber Identity Module) application, which is associated with a mobile telephone customer or subscriber. Alternatively it is possible to use a simple (i.e. non-intelligent) memory card, such as an MMC (multimedia card), CF (compact flash), MemoryStick, etc. as the storage medium.

As the SIM card or UICC card with USIM application or USIM module is generally issued by the network operator to the mobile telephone customer when the contract is signed (but is not said customer's property from a legal point of view), a network operator can store the access information for specific service providers (which can supply different services) on the SIM card or in the USIM module and according to this method can even offer a specific service from different service providers at different prices to specific target groups. For example an IMS service with limited functionality from a service provider A can thereby be utilized subject to more favorable conditions, while an IMS service from a service provider B with full IMS functionality can be utilized subject to more expensive conditions. The mobile telephone subscriber then has the option of making an independent selection from one of the services offered (the favorable one from provider A or the expensive one from provider B) but not of being able to utilize new services, which have not been agreed with their network operator. The service lock thus implemented is clearly associated with a specific mobile telephone subscriber, because the individual access information is stored on a storage means, i.e. in particular the SIM card or USIM module, which is associated with a specific mobile telephone subscriber and—according to a variant of this invention—is preferably (for example automatically) used when a link is set up.

As access information for each service, preferably the corresponding IP access address of the service providing component, is stored on the SIM card or USIM module, it is also ensured that different services from different service providers can be utilized, for example an MMS service from a service provider A and an IMS service from a service provider B. A simple change with regard to a service, for example an MMS service from the service provider A to the service provider C, which may offer more favorable MMS conditions, is made impossible for the mobile telephone subscriber or customer by the method according to the invention, in particular in the case of read-only access information.

To summarize, it can also be said that according to an advantageous embodiment of a method according to the invention a) first of all a network operator of a network stores access information for at least one service providing component from a specific service provider on a storage means associated with a mobile radio telephone subscriber (such as the SIM card or USIM module), on which access authorization for the network is also advantageously stored. The access information is thereby advantageously stored in a storage area of the storage means with restricted storage authorization or write authorization, so that only the network operator can change access information on the storage means or store on said storage means. If the access information is stored by or on the part of the network operator, the subscriber, in particular the mobile telephone subscriber, must receive the storage means associated with them and connect said means to their subscriber terminal. It is also possible for the network operator to provide the access information via the network in the storage means, which is hereby connected to a corresponding (subscriber) terminal, which is designed for access to the network. b) In the event that the mobile telephone subscriber has agreed the use of a plurality of providers for a specific service such as the MMS service with the network operator, said subscriber can select a specific one of the at least one service providing components, for which the access information is stored on the storage means. The subscriber terminal is hereby advantageously designed so that it only allows the selection of service providing components, for which the access information is stored on the storage means, and does not allow the inputting of access information for new service providing components. For this purpose, for example, inputting operations by a mobile telephone subscriber to request services can be monitored, whereby a corresponding service can only be requested in the event of correspondence (after a comparison) with the access information stored in the storage means for specific service providing components. If the (permitted) service is now selected, the mobile telephone subscriber or their subscriber terminal will set up a c) communication link to the corresponding service providing component using the stored access information. A service is advantageously selected by the mobile telephone subscriber simply selecting a designation of a service including a specific service provider on a user interface of the subscriber terminal, whereby the corresponding access information is read automatically from the storage means and the communication link to the corresponding service providing component is set up automatically, i.e. in both instances without further intervention on the part of the subscriber. This means that only the services agreed with the network operator are accessible for the mobile telephone subscriber and other or new services are locked out.

If we now look at the application of the method according to the invention to a packet-switched data transmission, according to an advantageous embodiment a specific packet data protocol type number can be associated with one or each specific service, said number determining the packet data protocol type or PDP type. Generally the PDP type is preferably processed according to the processing as known from the prior art of the hitherto standard PDP types. The purpose, set-up and currently available PDP types are disclosed in the specification 3G TS 23.060 and in 3G TS 24.008. Generally it is necessary for the purposes of exchanging data with external packet data networks (PDN) for a subscriber terminal in the form of a mobile terminal (also referred to as a mobile station or user equipment), once a successful packet-switched link has been established according to the GPRS standard (in the GSM architecture; GSM=Global System for Mobile Communication) or the UMTS standard, to request one or a plurality of addresses used in the PDN, such as an IP address for if the PDN is an IP network. This address is referred to as a PDP address. It is either static or dynamic. If it is static, the PDP address is established once, while if it is dynamic it is redistributed for each session. For each session what is known as a PDP context is generated, which describes the characteristics of this session. It contains the PDP type, the PDP address associated with the mobile station, the required quality of service (QoS) and the address of the GGSN, which serves as an access point for the PDN. This PDP context is stored in the mobile station or the user equipment (UE), the SGSN and GGSN. With an activated PDP context the mobile station becomes "visible" to the external PDN and can send and receive data packets. By aligning the addresses, the GGSN can transmit data packets between the PDN and the UE. One subscriber can have a plurality of active PDP contexts at the same time.

In particular the definition of a specific PDP type for a specific service can allow specific processing for this service in the packet-switched network, in particular the core network. If we look for example at an MMS service or an IMS service, the service-specific processing relates for example to MMS/IMS-specific charging models, the particular processing of MMS/IMS messages in overload situations, specific MMS/IMS routing within the core network or the setting up of a PPP (Point to Point Protocol)/IP link for MMS/IMS messages via a Gi interface from a GGSN to a specific service server (MMS server, IMS server, internet server, etc.), which is defined via the end-user address in the access information. By defining a specific PDP type, information can be made available to the network elements involved without a great deal of modification in the mobile telephone network elements SGSN and GGSN or in the Gi interface, said information allowing it to be identified from the specific PDP type whether a specific service, such as the MMS service, is activated via a PDP context. This new information allows the mobile telephone network elements to implement service-specific processing.

According to an advantageous embodiment the storage means used in the method according to the invention can, as mentioned above, be configured as an intelligent memory card. In particular the access information can be stored in a structured storage unit of the intelligent memory card. The access information can thereby be stored in an elementary file (EF), whereby it is also possible for the access information to be stored in a different file, such as a master file or a dedicated file. One advantage of storing the access information on an intelligent memory card is that the subscriber terminal can easily be changed at any time, simply by changing the memory card or taking it out of one subscriber terminal and inserting it in another subscriber terminal. This means that the subscriber, in particular the mobile telephone customer, is not restricted to a specific subscriber terminal when utilizing their services.

According to a further advantageous embodiment the subscriber terminal is configured as a mobile telephone device, in particular a mobile telephone, which advantageously operates according to the UMTS standard or the GSM standard, advantageously in conjunction with the GPRS standard. A subscriber terminal can however comprise any communication terminal (such as a computer, etc.), with which a user-specific storage means can be associated and which can be connected via a network to a service providing component of a service provider.

BRIEF DESCRIPTION OF THE DRAWINGS

The various advantages and novel features of the present disclosure will be more readily apprehended from the following Detailed Description when read in conjunction with the enclosed drawings, in which.

DETAILED DESCRIPTION

Figure 1:
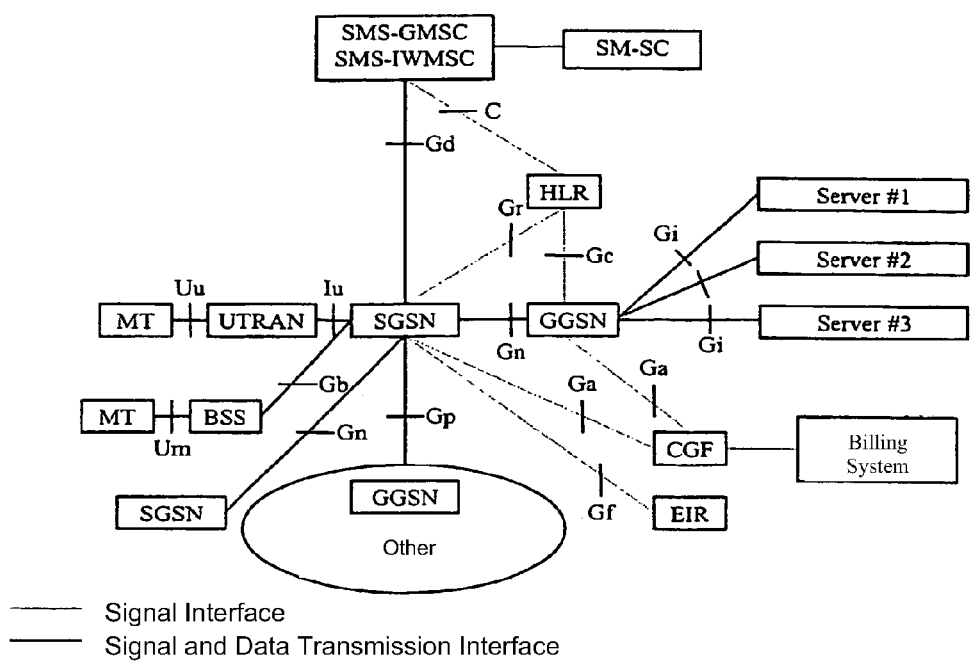
FIG. 1 shows a schematic network overview of packet-switched data services with three different servers connected for the provision of services.

FIG. 1 shows an overview of data services packet-switched via a network structure and the application of three servers of service providers for providing specific data services. The network structure shown essentially corresponds to the packet domain logical architecture, as known for example from FIG. 2 of 3G TS23.060. Only the part of the network structure necessary to clarify the present invention is set out in detail below, whereby for further details, reference should be made to the above sources. Depending on the standard to which a mobile telephone device MT operates, it is connected to a specific access network. In the case of the UMTS standard, the mobile telephone device MT is connected via a Uu interface to a UMTS terrestrial radio access network (UTRAN), while in the case of the GSM/GPRS standard it is connected via a Um interface to a base station system BSS. The mobile telephone device MT can be connected to the core network via the UTRAN by means of what is known as an Iu interface or via the BSS network by means of a Gb interface. The core network is essentially implemented by means of two network nodes. These are on the one hand the Serving GPRS Support Node (SGSN) and on the other hand the Gateway GPRS Support Node (GGSN). The SGSN can therefore support a packet-switched data transmission both according to the GSM/GPRS standard and according to the UMTS standard. The SGSN and GGSN are connected to each other via a Gn interface. As shown in the lower part of FIG. 1, the SGSN can communicate with other SGSNs or GGSNs in its own network and also other networks (other Public Land Mobile Networks PLMN).

The GGSN can establish a link via a respective Gi interface with one of the servers #1, #2 and #3. These servers #1, #2, #3 are parts of a Public Data Network PDN. The PDP (Packet Data Protocol) address specific to a defined one of the servers #1, #2 and/or #3 is evaluated by the PDN.

Data is generally contained in what is known as a Home Location Register (HLR) in the same way as individual data of individual subscribers and routing information. The HLR is hereby accessible for example via what is known as a Gr interface from the SGSN and via what is known as a Gc interface from the GGSN.

Figure 2:
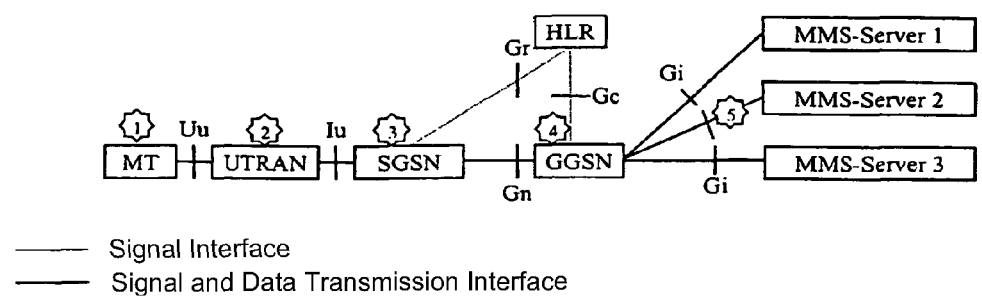
FIG. 2 shows a simplified network overview with packet-switched data services with three different MMS servers connected.

Reference is made below to FIG. 2, which is used to describe an embodiment of the invention. For this purpose FIG. 2 shows a simplified overview of a network structure also described with reference to FIG. 1, whereby instead of the servers #1, #2 and #3 the servers MMS server 1, MMS server 2 and MMS server 3 are specifically provided to provide an MMS service. It is further assumed that a subscriber or mobile telephone customer possesses a mobile telephone device operating according to the UMTS standard including a UICC card with USIM module associated with it and wishes to utilize an MMS service, whereby said subscriber has agreed contractually with their network operator that they will only use the service which is supplied by the service provider operating the MMS server 2. The access information, in particular in the form of an IP address, for the MMS server 2 is therefore stored on the USIM application of the UICC card of the customer for the MMS service. The UICC card with USIM application associated with the mobile telephone subscriber or mobile telephone customer is connected to the mobile telephone device of the mobile telephone subscriber. It is now assumed that the mobile telephone subscriber activates a PDP context with a specific PDP type MMS in their mobile telephone device MT (see reference 1 in the star). On activation of the MMS type PDP context the IP address of the MMS server 2 is automatically written in the mobile telephone device MT in an MMS end-user address information element of the PDP type MMS and sent via the air interface UTRAN (see reference 2 in the star) to the SGSN (see reference 3 in the star) and from there on to the GGSN (see reference 4 in the star). The evaluation of the MMS end-user address of the PDP type MMS takes place here. The GGSN uses the Gi interface to set up a PPP/IP link to the MMS server 2, the IP address of which is in the MMS end-user address of the PDP type MMS (see reference 5 in the star). According to this embodiment of the method the mobile telephone subscriber is therefore unable to utilize the MMS service from another, more favorable service provider. The method described can also be used in a similar manner for other services such as the IMS service.

Figure 3:
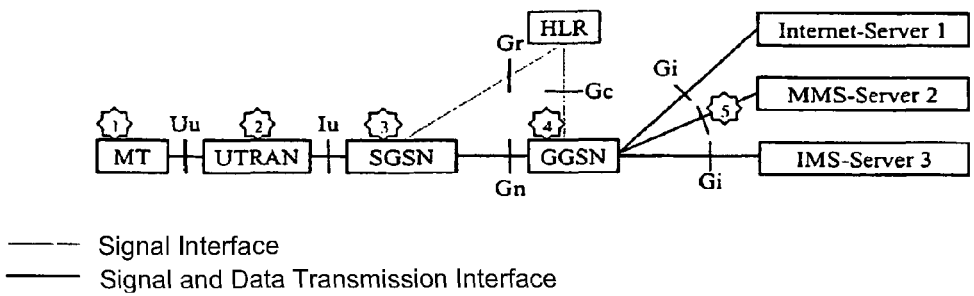
FIG. 3 shows a simplified network overview with packet-switched data services with three different servers connected for different data services.

Reference is now made to FIG. 3, with reference to which a further embodiment is described. For this purpose FIG. 3 shows a simplified overview of a network structure, as described with reference to FIG. 1, whereby as a characteristic of this embodiment the GGSN can forward packet-switched data streams for different services to three different servers, i.e. internet server 1, MMS server 2 and IMS server 3, with a specific IP address in each instance. As the designations of the respective servers show, the internet server 1 provides a service for internet surfing, the MMS server 2 provides an MMS service and the IMS server 3 provides an IMS service. The mobile telephone subscriber or mobile telephone customer in turn has agreed contractually with their network operator to utilize the service of one of the servers mentioned respectively above when using the internet, an MMS service or an IMS service. Therefore for the use of the internet the IP address of the internet server 1, for the use of the MMS service the IP address of the MMS server 2 and for the use of the IMS service the IP address of the IMS server 3 are stored on the USIM application or the USIM module of the UICC card of the mobile telephone device MT of the mobile telephone subscriber connected to the mobile telephone device MT. Depending on which service is requested by the mobile telephone subscriber, i.e. which PDP context is activated in the mobile telephone device MT, the corresponding IP address is written into the end-user address information element of the corresponding PDP type. Should a mobile telephone subscriber for example wish to use the MMS service, on PDP context activation for the MMS service the IP address of the intended MMS server 2 stored in the USIM application is input into the MMS end-user address information element (see reference 1 in the star) and transmitted from the mobile telephone device MT via the UTRAN (see reference 2 in the star) to the packet-switching network elements SGSN (see reference 3 in the star) and GGSM (see reference 4 in the star) of the mobile telephone system. The GGSN can then set up a PPP/IP link to the selected MMS server 2 via the Gi interface using this MMS end-user address (see reference 5 in the star). This means that for a specific service the mobile telephone subscriber can only access a previously defined server. In other words in this variant the mobile telephone subscriber has to use the IP addresses stored by the network operator in their USIM module.

Figure 4:
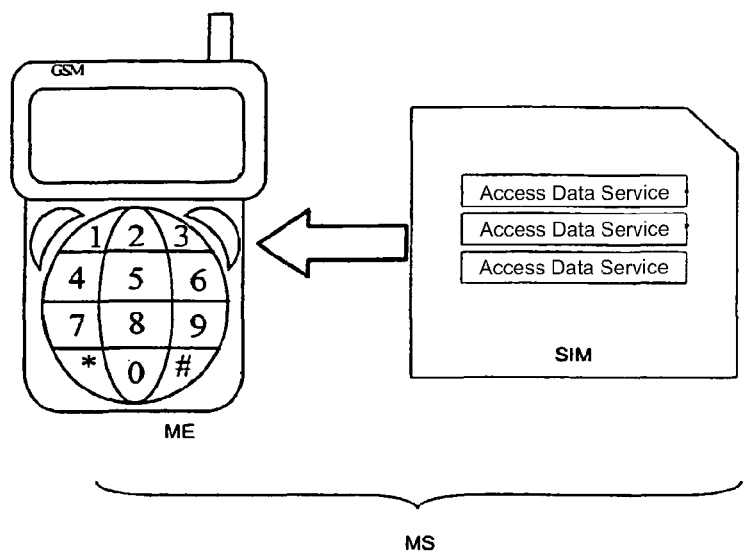
FIG. 4 shows a schematic illustration of a mobile station in the form of a mobile telephone according to the GSM or GPRS standard.

Reference is now made to FIG. 4, in which a mobile station MS comprising a mobile telephone ME and a SIM card connected to this are shown. According to the current 2G mobile telephone systems according to the GSM standard or in 2.5G mobile telephone systems, in which this standard is extended to include GPRS, a SIM card, which is associated with a specific mobile telephone subscriber or mobile telephone customer is inserted in a mobile telephone ME. A mobile telephone subscriber with a mobile telephone or mobile telephone device ME, which operates according to the GSM standard or in some cases with GPRS extension, who for example wishes to use an internet service, an MMS service and an IMS service, can purchase a SIM card from a network operator, on which access information, in particular IP addresses, for service provider servers is stored, as defined by the network operator. If we now look at the method shown in FIG. 3, an IP address of an internet server can be stored for a first service "internet", an IP address of an MMS server can be stored for a second service "MMS" and an IP address for an IMS server can be stored for a third service "IMS".

Figure 5:
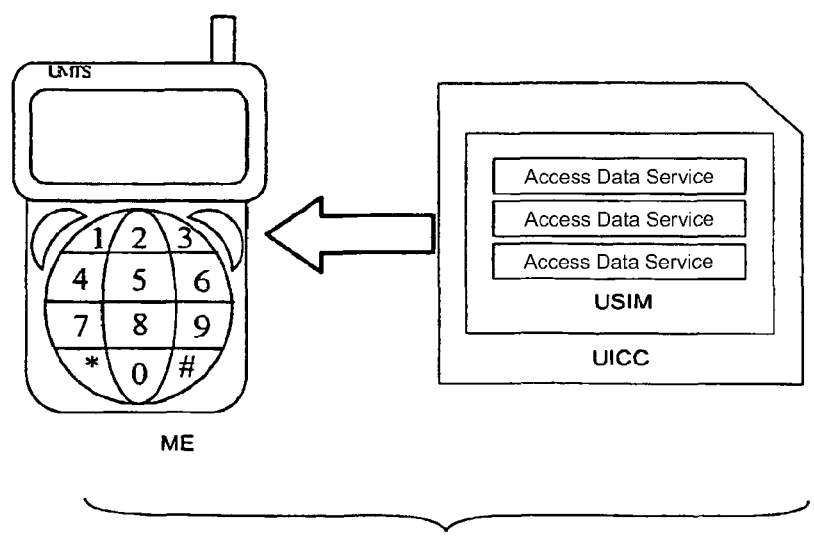
FIG. 5 shows a schematic illustration of user equipment according to the UMTS standard.

Let us now refer to FIG. 5, in which a mobile terminal according to the UMTS standard is shown, also referred to here as user equipment UE. This user equipment UE comprises a mobile telephone device or mobile telephone ME, which is connected to a UICC card associated with a mobile telephone subscriber, said card comprising a USIM module. As already described with reference to FIG. 2 or FIG. 3, access information or IP addresses of servers can be stored in the USIM application, as defined by the network operator of the mobile telephone subscriber.

Figure 6:
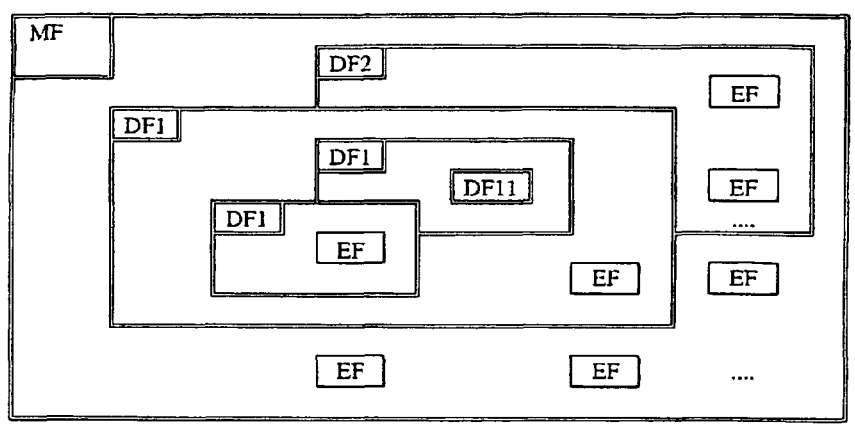
FIG. 6 shows a schematic diagram of the organization of a USIM application.

In order to store different data or information, the storage unit of an intelligent memory card, such as a UICC card with a USIM module, is organized in a hierarchical structure, which is shown in FIG. 6. There are three different types of file in this, i.e. a master file MF, dedicated files DF and elementary files EF. These files can either be organization-specific or application-specific. An operating system organizes access to the data or information stored in the different files. Safety barriers and access restrictions for data evaluation and/or changes to stored data are provided in these in a manner known per se. In particular data is only released after a correct identification number has been input, e.g. the PIN (Personal Identification Number).

Figure 7:
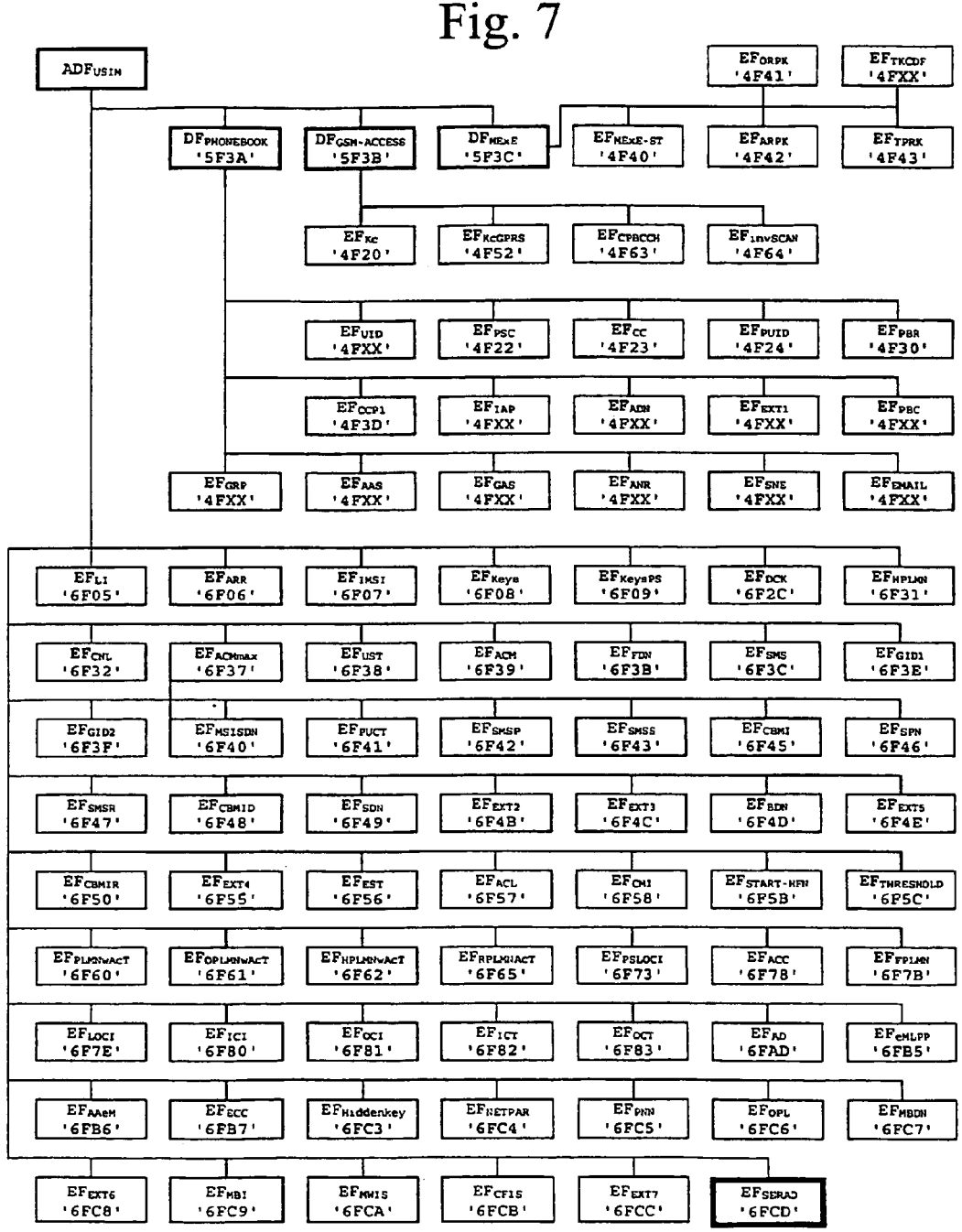
FIG. 7 shows a detailed illustration of a storage structure for storing access information, in particular an IP address, on a USIM application.

When access information, in particular in the form of an IP address, is stored in a SIM card or in the USIM module on a UICC card, the IP address can be stored in an elementary file EF. In the diagram in FIG. 7 one or a plurality of addresses are stored in a USIM module. One elementary file in the USIM is reserved for the IP address(es) of servers of service providers which provide specific services. This elementary file is shown in the bottom right section of the diagram and marked with the name EFSERAD (for elementary file SERvice Address). This elementary file could for example be addressed with the address 6FCD. By providing specific access information for specific services on the memory card of a mobile telephone customer, the network operator is able to tie the customer to specific services from specific service providers.

While the invention has been described with reference to one or more exemplary embodiments, it will be understood by those skilled in the art that various changes may be made and equivalents may be substituted for elements thereof without departing from the scope of the invention. For example, one variant is particularly advantageous, in which the access information is stored in those storage areas (for example elementary files) on the SIM card or the USIM model which are protected from access by the mobile telephone subscriber for overwriting or modifying purposes but can still be modified by the network operator. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for transmitting data of a service between a subscriber terminal of a specific mobile telephone subscriber and at least one service providing component of one or more service providers through a mobile telephone network managed by a network operator, the method comprising the steps of:

(a) prior to setting up a communication link from a subscriber terminal to a service providing component, pre-allocating, by the network operator, a specific service associated with the at least one service providing component to the specific mobile telephone subscriber by:

storing access information for use of the at least one service providing component in a storage area of a storage medium associated with the subscriber terminal or the subscriber, the storage medium further includes authorization information for use of the mobile telephone network;

restricting authorization for write processes to the storage area of the associated storage medium including the stored access information such that only the network operator can change the access information for use of the at least one service providing component; and associating a plurality of access addresses for the at least one service providing component with a specific service in the access information;

(b) selecting at the subscriber terminal a service providing component, the service of which is to be requested by selecting an access address of the selected service providing component;

(c) determining at the subscriber terminal, before or while the communication link is being set up, whether the selected access address corresponds to one of the one or more associated plurality of access addresses for the specific service in the storage area of the associated storage medium such that whether the selected service providing component is permitted is verified before or while the communication link is being set up; and (d) at the subscriber terminal, after selecting the access address of the service providing component, setting up the communication link from the subscriber terminal to the selected service providing component, and requesting access to the service only if the selected access address and the access address for the specific service stored in the storage area of the associated storage medium correspond.

2. The method according to claim 1, wherein the network comprises a packet-switching network, and the data is transmitted in packet-switched form.

3. The method according to claim 2, wherein the packet-switched network is a General Packet Radio Service (GPRS) network.

4. The method according to claim 2, wherein the packet-switched network is a Universal Mobile Telecommunications System (UMTS) network.

5. The method according to claim 2, wherein a specific packet data protocol type is associated with each service.

6. The method according to claim 1, wherein the at least one service providing component is a part of an external packet data network (PDN) that communicates with the network.

7. The method according to claim 1, wherein the access information contains an end user address, which comprises the access address of the at least one service providing component.

8. The method according to claim 7, wherein the access address is an internet protocol address.

9. The method according to claim 1, wherein the associated storage medium is an intelligent memory card associated with the specific mobile telephone subscriber.

10. The method according to claim 9, wherein the memory card is configured as one of a SIM card and a UICC card with a USIM application.

11. The method according to claim 9, wherein the access information is stored in a structured storage unit of the intelligent memory card.

12. The method according to claim 11, wherein the access information is stored in an elementary file (EF) of the structured storage unit.

13. The method according to claim 1, wherein restricting authorization for write processes comprises restricting authorization such that only a network provider of the mobile telephone network is able to amend or store access information for the at least one service providing component in the storage area of the storage medium associated with the subscriber terminal.

14. The method according to claim 1, wherein determining whether the selected access address corresponds to one of the one or more associated plurality of access addresses for the specific service is determined before or during setting up a communication link of the subscriber terminal.

15. The method according to claim 1, wherein requesting access to the service comprises requesting access only if the selected access address and the access address for the specific service stored in the storage area of the associated storage medium correspond.

16. The method according to claim 1, wherein access authorization of the specific mobile telephone subscriber for the mobile telephone network is provided on the associated storage medium.

17. The method according to claim 16, wherein the mobile subscriber terminal comprises a mobile telephone device, and wherein the mobile telephone device is one of a UMTS mobile telephone device, a GSM mobile device and a GPRS mobile device.

18. The method according to claim 1, wherein the subscriber terminal is a mobile subscriber terminal.

19. An apparatus for controlling the transmission of data of a service associated with at least one service providing component of one or more service providers over a mobile telephone network managed by a network operator, comprising:

a subscriber terminal of a specific mobile telephone subscriber; and a storage medium associated with the subscriber terminal or a subscriber;

wherein prior to setting up a communication link from the subscriber terminal to a service providing component, the network operator pre-allocates a specific service associated with the at least one service providing component to the specific mobile telephone subscriber by:

storing access information for use of the at least one service providing component in a storage area of the storage medium, the storage medium further includes authorization information for use of the mobile telephone network;

restricting authorization for write processes to the storage area of the associated storage medium including the access information such that only the network operator can change the access information for use of the at least one service providing component; and associating a plurality of access addresses for each of the at least one service providing component of the one or more service providers with the specific service in the access information; and wherein the subscriber terminal is configured to:

select a service providing component, the service of which is to be requested by selecting an access address of the selected service providing component;

determine, before or while the communication link is being set up, whether the selected access address corresponds to an access address for the specific service in the storage area of the associated storage medium such that whether the selected service providing component is permitted is verified before or while the communication link is being set up;

after selecting the access address of the service providing component, set up the communication link from the subscriber terminal to the selected service providing component only if the selected access address and the access address for the specific service stored in the storage area of the associated storage medium correspond; and request access to the service only if the selected access address and the access address for the specific service stored in the storage area of the associated storage medium correspond.

20. The apparatus according to claim 19, wherein the associated storage medium comprises a storage device for storing access information for at least one service providing component, which can be connected to the subscriber terminal via the network.

21. The apparatus according to claim 19, wherein the associated storage medium is an intelligent memory card associated with the specific mobile telephone subscriber.

22. The apparatus according to claim 21, wherein the intelligent memory card is one of a SIM card and a UICC card with a USIM application.

23. The apparatus according to claim 21, wherein the intelligent memory card is configured as a multi-media card.

24. The apparatus according to claim 21, wherein the storage area of the associated storage medium includes restricted authorization for write processes of access information.

\* \* \* \* \*

UNITED STATES PATENT AND TRADEMARK OFFICE
CERTIFICATE OF CORRECTION

PATENT NO. : 8,549,110 B2  
APPLICATION NO. : 10/482444  
DATED : October 1, 2013  
INVENTOR(S) : Jerbi Belhassen et al.

Page 1 of 1

It is certified that error appears in the above-identified patent and that said Letters Patent is hereby corrected as shown below:

On the Title Page item [30] Foreign Application Priority Data: After "101 51 743" please insert -- "Nov. 4, 2002 (EP) 02008315.0" --

Signed and Sealed this
Fourth Day of March, 2014

Michelle K. Lee
*Deputy Director of the United States Patent and Trademark Office*